Jan. 4, 1938. H. E. RUPP ET AL 2,104,355
SHAFT SEALING MEANS
Filed Dec. 18, 1936
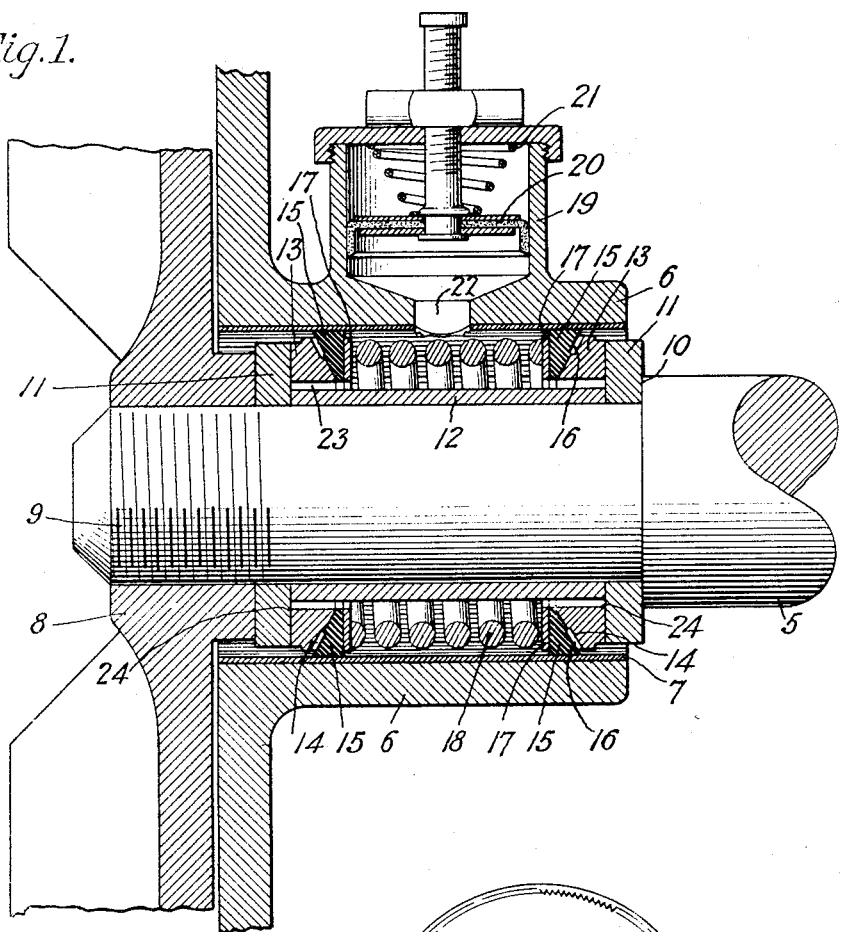
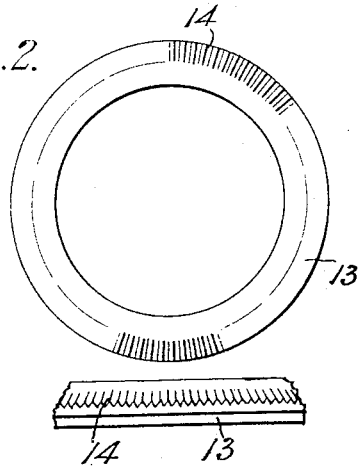
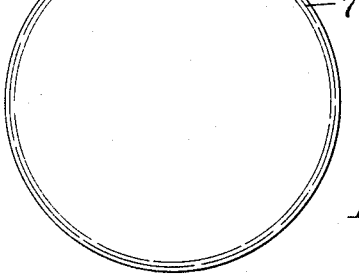
INVENTORS
Herbert E. Rupp and
James C. Gorman
BY Dowell & Dowell
their ATTORNEYS Patented Jan. 4, 1938

2,104,355

UNITED STATES PATENT OFFICE 2,104,355

SHAFT SEALING MEANS

Herbert E. Rupp, Springfield Township, Richland County, and James C. Gorman, Mansfield, Ohio Application December 18, 1936, Serial No. 116,612

4 Claims. (Cl. 286—7)

This invention relates to rotary shaft fittings and more particularly to means for sealing such shafts against fluid leakage around their points of entry into housings and the like.

The primary object is to provide an improved sealing means, causing the least possible friction upon the shaft and thereby reducing wear as well as the power necessary to drive the same. Simplicity and economy in composition are added objectives incidental thereto, while durability is an important essential of consideration likewise included.

Another paramount object is to provide for a positive and plentiful lubrication assuring full efficiency and reducing the possibility of heating, with resultant binding, to the fullest possible extent.

Other objects and the particular advantages of the invention will be set forth or appear from the following description made with reference to the attached drawing, which illustrates one practicable embodiment of the same in application to the rotor shaft of a centrifugal liquid pump.

In said drawing:

Fig. 1 is a vertical section view of the sealing means on one end of a shaft shown broken away, and with the main journaling support therefor omitted;

Fig. 2 is a front elevation or plan view of one of the component members;

Fig. 3 is a fragmentary side or edge elevation view of said member; and

Fig. 4 is an end view of another member or part.

In the illustrative construction, the rotatable shaft 5 extends through a hub or housing 6, in this instance forming a part of an impeller casing that is shown only fragmentarily. This hub or housing is provided with a cylindrical liner 7, which may advantageously—and in some instances will perhaps preferably—have its inner surface longitudinally serrated (see Fig. 4), although this is not actually necessary and a smooth surface will ordinarily serve just as satisfactorily.

At the inner side of the hub said shaft carries a member 8, in this instance comprising the rotor or impeller wheel of a pump fixed on one end of the shaft which is formed with threading 9 to so engage it and to tighten the engagement with its turning; in other words the threading is in a direction opposite to that of the shaft rotation. Said member 8 therefore provides a shoulder on the shaft at the inner side of the hub. At the outer side of the hub said shaft is formed with a shoulder 10 opposing that provided by the aforedescribed carried member. Thus the part, or substantially the whole part, of the shaft encompassed by the hub is confined between enlargement edges.

Against these opposed shoulders on the shaft are a pair of flat washer or bearing rings 11 pressed one to each, and between said rings is a spacer sleeve 12 fitted close upon the shaft. The order of assembly of these parts is of course inward—or outward with respect to the shaft end—from the shoulder 10, the aforementioned carried member 8 being applied lastly or only after said last-named parts have first been placed in position. This applies also to additional parts located between the two rings which are hereinafter next described. It will be apparent that when said two rings 11, the interposed spacer sleeve 12 and the fixed member 8 are secured in place, with said member screwed tight upon the shaft, or the shaft rotated so as—by the reverse threading—to force them into a firm binding against one another, they will mutually and together rotate as a unit with the shaft.

Bearing against the spaced flat rings 11 is an opposed pair of conical wear rings 13 engaged over the sleeve 12 somewhat loosely. The front faces of these conical or wear rings taper or slope inwardly toward their common axis and the wider or outward marginal portions of said faces are circumferentially formed with radial serrations 14 extending preferably continuously all the way around as shown (see Figs. 2 and 3), while the narrower marginal portion or substantially one half of the said faces remains entirely smooth. The back faces of said rings are perfectly flat to squarely contact the opposed faces of the first mentioned flat rings and to bear closely against the same in opposed rotative relation. For this reason also the metal of both pairs of rings is desirably of good wear and heat resisting character. It will be observed that the peripheries of said conical rings, like those of the flat rings, do not contact the inner surface of the hub liner 7 but are on the contrary spaced somewhat therefrom.

Pressed against the inclined faces of the conical wear rings is an opposing pair of relatively soft and flexible locking rings 15, composed of rubber for instance, having complementary or intraconical faces 16 fitted thereto so as to engage by embedding into the serrations 14 and lock the two rings of the respective pairs together. These flexible locking rings are also fitted and pressed peripherally against the inner surface of the hub liner 7 so as to frictionally bind and hold them, and consequently the conical wear rings as well, anti-rotationally or stationary. Their tendency to expand radially under axial compression will of course bind them the more tightly against said liner and if the liner is longitudinally serrated, as described hereinbefore, they will by embedment engage it more positively still to be held from rotative movement. However, whether the liner is serrated or not, they will be free to move axially or in either direction along the shaft, for the longitudinal serrations in the liner would not interfere with such movement any more than a smooth surface would do. These flexible rings 15 also serve to center the conical rings 13 upon the shaft, or the spacer sleeve 12 over which they loosely engage. Backing said flexible rings are a pair of retaining washer-rings 17 bearing oppositely against their flat inner sides, and between the last-named washer-rings is an expanding spring 18 fitted over the spacer sleeve and exerting the force which presses and holds the flexible rings in the described functional state or place.

Thus the concentrically related parts together provide an effectual seal preventing the leak or escape of fluid from the inner side of the hub or shaft entry into a casing. The elastic rings pressed axially into tight lock against the conical wear rings and radially into tight bind against the hub liner prevent any leakage past these points. The serrations in the conical rings, and in some instances also in the hub liner, not only promote or increase the tightness of the seal but likewise serve to hold said elastic and conical rings firmly against rotative movement that might otherwise be communicated or indirectly induced frictionally by the shaft. The organization and assembly is moreover simple, altogether durable and quite inexpensive. From the practical standpoint it constitutes all that is desired and fulfills all requirements necessary in a mechanical appliance or means of the kind.

The several parts, and particularly the flat washer and conical rings 11 and 13 respectively, are lubricated expeditiously by a spring-loaded grease-cup 19 in this instance formed in the top of the hub or housing 6. This grease-cup, which is filled with an appropriate fluidable lubricant, has a plunger 20 forced down by a spring 21, thereby pushing such lubricant downward through a feed passage 22 into the hub through and laterally around the spring 18 between the washer-rings 17. The force of feed continually spreads it of course throughout the space between said washer-rings and over said interposed spring, the spacer sleeve 12 and the liner 7 in substantial fill of said space.

Through passage spaces or the clearances 23 under the flexible and conical rings, opening from the main or central space, a part of the lubricant will be forced also to the points 24 of conical and bearing ring meeting, from which it will be drawn between the contacting surfaces of these relatively stationary and rotating members by molecular attraction. A positive and plentiful lubrication is thereby provided to reduce friction and possible heating of the parts and to maintain the full efficiency of the seal, for the lubricant will likewise augment the latter by filling the hub space and repelling fluid passage therethrough.

It will be understood that the rotatable shaft is not intended to receive its support in the described structure but that said shaft has separate support and journalling in associated bearings not shown. It will be understood also that the shaft need not be a rotary shaft and that the invention may be applied as well to a stationary shaft for the same purpose if that should be desired.

The described means may of course be embodied in various constructions and various changes may be made in the form, arrangement and relation or combination of its parts either from preference or to suit different requirements, within the general purpose and scope of this invention. Therefore, the appended claims are not intended to limit the invention to the specific construction or assemblage of parts herein illustrated and above particularly set forth.

Having thus described our invention, what we claim as new and desire to secure by Letters Patent of the United States is:

1. A sealing means for a shaft extending through a housing, comprising, in combination with the shaft and housing, a liner for that part of the housing through which the shaft extends, enlarging shoulders provided on the shaft at opposite ends of the liner, washer rings between and oppositely bearing against said shoulders, a spacing member between said washer rings, the said spacer member, washer rings and shoulder provisions being together rotatable with the shaft, conical wear rings between and oppositely pressed against said washer rings with their conical faces disposed inwardly, opposed conical flexible rings between and oppositely pressed against said wear rings with their conical faces radially overriding and frictionally locking into contact with the conical faces of the former and with their peripheries also fitting and pressed into frictional anti-rotational bind against the inner surface of the housing liner, retaining rings between said flexible rings oppositely pressed backingly thereagainst, and a coil spring between said retaining rings oppositely pressing said pressed members, the said wear rings being provided with serrations in their conical faces with which the flexible rings engage to lock the two together.

2. Sealing means for a shaft, comprising, in combination with the shaft, a hub portion through which the shaft extends, a liner for said hub portion, enlargement shoulders provided on the shaft at opposite ends of said liner, washer rings between said shoulders oppositely bearing against the same, a spacer sleeve fitted on the shaft between said rings, conically-faced wear rings engaged over the sleeve between the washer rings and oppositely pressed against said washer rings with their conical faces disposed inwardly, flexible rings between said wear rings and having opposed intra-conical faces oppositely pressed into binding contact with the conical faces of the former and with the peripheries thereof also fitted and pressed into binding engagement with the inner surface of the hub liner, retaining rings between said flexible rings oppositely pressed backingly thereagainst, and a coil spring between said retaining rings oppositely pressing said pressed members together; the conical faces of the wear rings being serrated in portions circumferentially so as to engage in the intra-conical faces of the flexible rings pressed thereagainst.

3. Sealing means for a shaft, comprising, in combination with the shaft, a hub part through which the shaft extends, a liner for the hub, enlargement shoulders provided on the shaft at opposite ends of the liner, washer rings between said shoulders oppositely bearing against the same, a spacer sleeve fitted on the shaft between said rings, conically-faced wear rings engaged over the sleeve between the washer rings and oppositely pressed against said rings with their conical faces disposed inwardly, flexible rings between said wear rings having opposed intra-conical faces oppositely pressed into binding contact with the conical faces of the former, and the peripheries of said flexible rings being also fitted and pressed to frictionally bind against the inner surface of the hub liner, retaining rings between said flexible rings oppositely pressed backingly thereagainst, and a coil spring between said retaining rings oppositely pressing said pressed members together; the inner surface of said hub liner being serrated longitudinally to engage in the peripheries of the flexible rings pressed radially thereagainst.

4. A sealing means for a shaft rotatable in a housing, comprising, in combination with the shaft and housing, a liner for that part of the housing through which the shaft extends, a member upon the shaft at the inner end of the liner providing a shoulder to the shaft, a shoulder provided on the shaft at the outer end of the liner, washer rings bearing oppositely against said shoulders, a spacer sleeve fitted on the shaft between said washer rings, the said sleeve, washer rings and shoulder-providing member being together rotatable with the shaft, conical wear rings engaged over the sleeve between the washer rings and oppositely pressed against said rings with their conical faces disposed inwardly, the said conical rings having serrations in their front conical faces, flexible rings between said conical rings and having opposed intra-conical faces oppositely pressed into locking contact with the serrated conical faces of the former, the peripheries of said flexible rings being also fitted and pressed to engage anti-rotationally against the inner surface of said housing liner and said liner being longitudinally serrated in said surface to provide a tight locking engagement between the two parts, retaining rings between said flexible rings oppositely pressed backingly thereagainst, and a coil spring between said retaining rings oppositely pressing said pressed members together.

HERBERT E. RUPP.
JAMES C. GORMAN.